United States Patent
McGregor et al.

(10) Patent No.: US 6,816,058 B2
(45) Date of Patent: Nov. 9, 2004

(54) BIO-METRIC SMART CARD, BIO-METRIC SMART CARD READER AND METHOD OF USE

(76) Inventors: Christopher M. McGregor, 1880 Steiner St., #405, San Francisco, CA (US) 94115; Travis M. McGregor, 2704 Manhattan Ave., #A, Manhattan Beach, CA (US) 90266; D. Scott McGregor, 620 Maple St., White Rock, BC (CA), V58 4M2

( * ) Notice: Subject to any disclaimer, the term of this patent is extended or adjusted under 35 U.S.C. 154(b) by 349 days.

(21) Appl. No.: 09/843,572

(22) Filed: Apr. 26, 2001

(65) Prior Publication Data

US 2002/0158747 A1 Oct. 31, 2002

(51) Int. Cl.[7] .............................. G05B 19/00; G06F 7/00; G08B 29/00; G06K 17/60

(52) U.S. Cl. ........................................ 340/5.26; 235/379

(58) Field of Search ................................ 340/5.26, 5.22, 340/5.23, 5.24, 5.51, 5.6; 235/375, 379, 386; 380/255, 277–47; 705/50–80; 713/150–186; 382/115–127

(56) References Cited

U.S. PATENT DOCUMENTS

| | | | | |
|---|---|---|---|---|
| 4,752,678 A | * | 6/1988 | Rikuna | 235/380 |
| 5,623,552 A | * | 4/1997 | Lane | 382/124 |
| 5,686,904 A | | 11/1997 | Bruwer | |
| 5,774,065 A | | 6/1998 | Marbuchi et al. | |
| 5,809,142 A | * | 9/1998 | Hurta et al. | 705/68 |
| 5,857,079 A | * | 1/1999 | Claus et al. | 705/33 |
| 5,903,225 A | * | 5/1999 | Schmitt et al. | 340/5.25 |
| 6,163,771 A | | 12/2000 | Walker et al. | |
| 6,404,337 B1 | * | 6/2002 | Van Till et al. | 340/569 |
| 6,554,193 B1 | * | 4/2003 | Fehrman et al. | 235/488 |

* cited by examiner

*Primary Examiner*—Michael Horabik
*Assistant Examiner*—Scott Au
(74) *Attorney, Agent, or Firm*—C. Bart Sullivan

(57) ABSTRACT

A system for increasing transaction security across existing infrastructure is provided. A user bio-metric sensor device is integrated into a credit or debit card. A display unit provides a key, preferably encrypted, upon successful utilization of the sensor device. Included in the key generation mechanism is an indicator of the transaction number or other sequential count indicative of card use. An authorization service decrypts the key in a manner at least partially dependent upon a second sequential count maintained in sync with the first count to determine whether the use is authorized.

16 Claims, 6 Drawing Sheets

BIO-METRIC SMART CARD, BIO-METRIC SMART CARD READER AND METHOD OF USE

BACKGROUND OF THE INVENTION

1. Field of the Invention

The present invention relates generally to the field of credit card security, and more particularly to a bio-metric smart card, a bio-metric smart card reader and a method of use for the card and reader.

2. Description of the Related Art

Recent innovations have brought significant security-related advances to the credit card, debit card, and consumer banking industries. In the 1980s, holographic images were introduced and included on plastic card faces to deter the manufacture of counterfeit cards. More recently, some cards have been adapted to include a photograph of the authorized user, thereby obviating the need for a purchaser to present separate identification and decreasing the likelihood of fraud. Most recently, smart cards, also known as personal data cards or chip cards, which include a memory chip integral with the card, now provide additional security features.

Despite these advances, the industry remains burdened by a considerable fraud problem. Credit card theft and fraud accounts for billions of dollars in damages a year in the U.S. alone, with billions more being lost overseas. Holographic images do nothing to deter the unauthorized use of a genuine card and new technology has made them easier to copy. Sub-thumbnail sized photos on cards are often too small for careful examination by store clerks, and like holograms, cannot be viewed during online or telephone-based transactions. And smart cards provide no new security features unless used across a new breed of card-reading infrastructure, which will cost hundreds of millions of dollars to install. Moreover, like the other new technologies described above, smart cards do not address online and telephonic sales scenarios wherein the merchant lacks the ability to examine the actual card. Perhaps most importantly, since smart cards are not compatible with the existing card-reading infrastructure they do not address the near term needs of the industry and the massive on-going losses caused by fraudulent use.

Referring to FIG. 1, there is illustrated an available system 100 for credit card processing. On a credit or debit card 110 there is permanently displayed on a front face surface 112 a multi-(typically sixteen) digit number representative of the card holder's debit or credit account. Also displayed on the surface 112 are the expiration date and card holder's name. A magnetic strip (not shown) is typically found on the back surface of card 110 and contains at least the information displayed on the front surface 112. To process a transaction using the card 110, a seller might use a magnetic strip reader 120 (such as available from Magtec, Inc.) by sliding the upper portion of card 110 through slot 122 to read the information stored within the magnetic strip. After the information is forwarded across network 125 to a financial institution or credit card authorization service, along with data about the requested transaction, a returned authorization number or denial message is displayed across display area 124. In the alternative, the user might read aloud over a telephone connection or otherwise transmit the account number, name and expiration information to a seller, who requests a transaction authorization from a central transaction authority across network 125.

In the above-described available transaction process, while recent security advances do provide some crime protection, there is still far more opportunity than desirable for deception and fraud. Specifically, if the card is lost or stolen the thief or finder of the lost card might use the card for fraudulent purchases. Also, if a thief finds or steals a receipt or similar record listing the card number and other card information found in field 112, that information might be fraudulently used for online or telephonic transactions.

There is therefore a need in the art for a new fraud-preventive system and method, which is compatible with the existing infrastructure, and can be used securely for remote, telephonic, or Internet-based transactions.

SUMMARY OF THE INVENTION

In general, the present invention is a system for increasing transaction security across existing credit card processing infrastructure. A user bio-metric sensor device is integrated into a credit or debit "smart card". A display unit provides a key, preferably encrypted, upon successful utilization of the sensor device. Included in the key generation mechanism is an indicator of the transaction number or other sequential count indicative of card use. An authorization service decrypts the key in a manner at least partially dependent upon a second sequential count maintained in sync with the first count to determine whether the use is authorized. A separate reader may be similarly configured to read existing smart cards utilizing the process the present invention.

In one embodiment, the present invention is a smart card style apparatus including a bio-metric sensor providing the user an authentication data input for proving the user is authorized to use the account number, a transaction counter for tracking authorized device access events, a processor in electrical communication with the user authenticator and counter, wherein the processor is programmed to generate a security key in response to authentication data received via the sensor, and a display unit to display the security key on the face of the card. The security key is derived at least in part from the contents of the counter. In another embodiment, the present invention is configured as a portable reader for reading and authorizing purchases using existing smart cards. The present invention may also be configured as a peripheral device to a computer system.

According to the present invention, a method of securely authorizing a transaction utilizing an account comprises confirming an authorized use of an account card via a bio-metric sensor, maintaining a first count indicative of a number of instances of such authorized uses, generating a security key in a manner at least partially dependent upon the count, transmitting the security key to an authorizing authority, processing the security key at the authorizing authority, maintaining a second count indicative of a number of transmissions received by the authorizing authority for the account, confirming that the security key was generated by an authorized user at least in part through use of the first count and the second count, and authorizing the transaction if the security key is validated.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a bio-metric smart card, bio-metric smart card reader and method of use. Any and all such modifications, equivalents and alternatives are intended to fall within the spirit and scope of the present invention.

Figure 1:
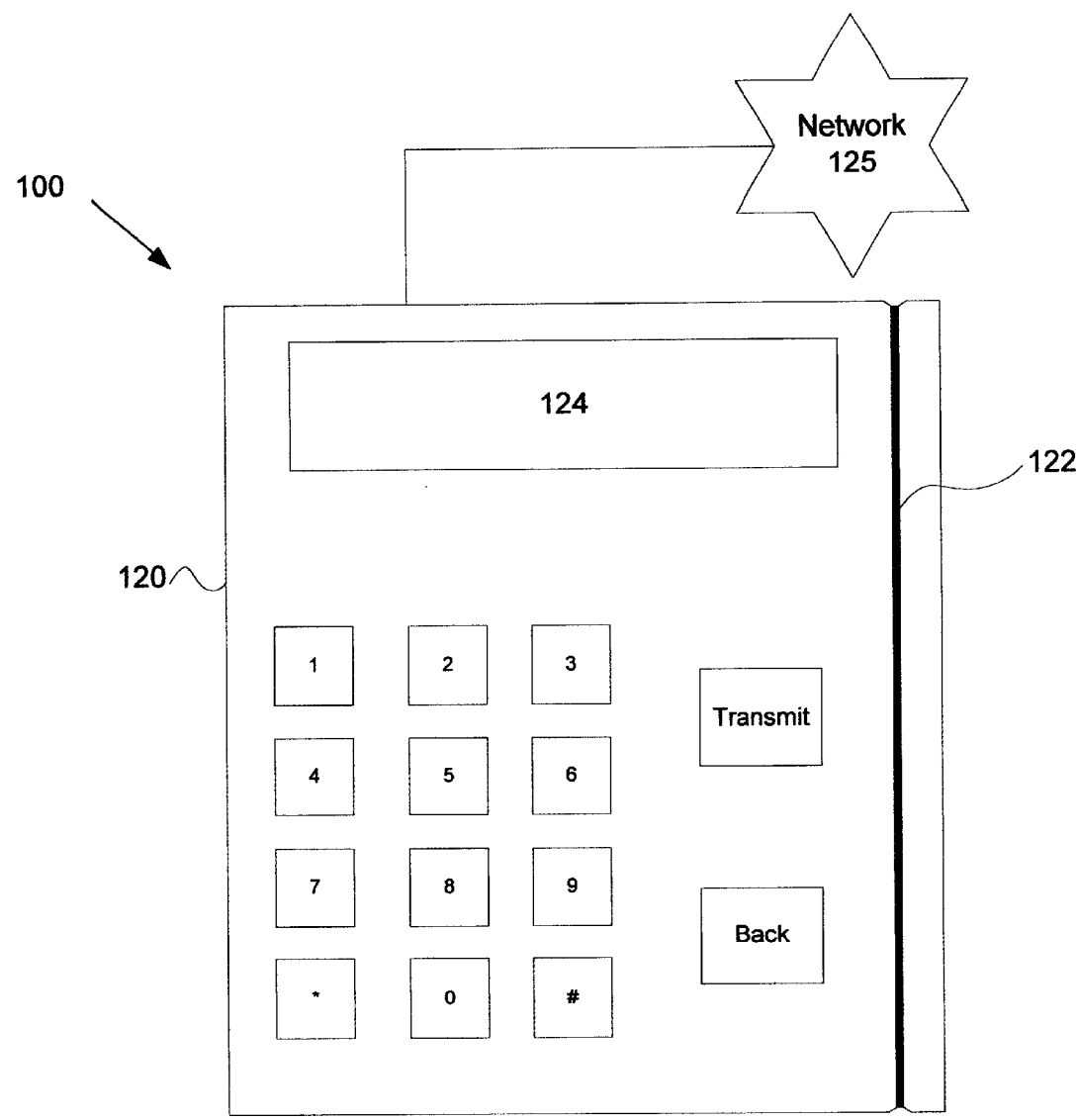
FIG. 1 is a block diagram illustrating an available credit card and transaction processing system.
Figure 1:
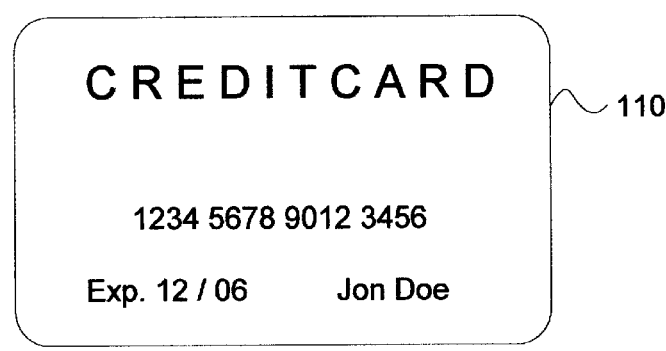
Figure 2:
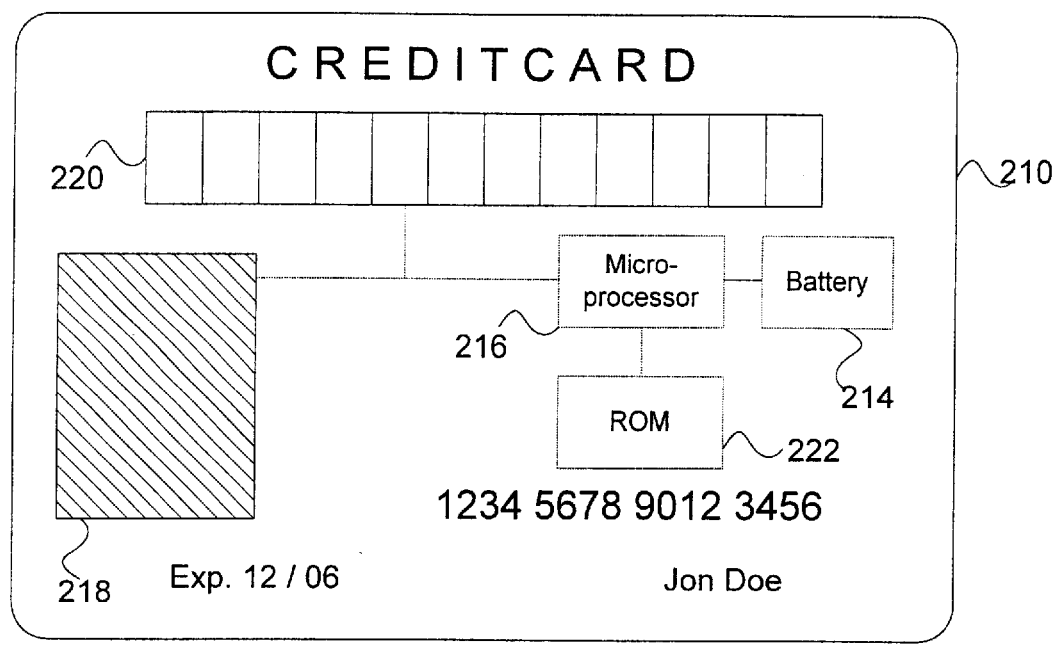
FIG. 2 is a diagram of one embodiment of the present invention.

One embodiment of the present invention is illustrated in FIG. 2. In this embodiment a bio-metric smart card 210 is shown. The bio-metric smart card 210 preferably has substantially the same shape and form factor as available plastic credit and debit cards such as card 110 in FIG. 1, although card 210 might be thicker as needed to accommodate newly-introduced internal components. On a front surface 212 of the card 210, in addition to the account number, name and expiration date display area, there is also preferably provided a bio-metric reading apparatus such as fingerprint scanner 218 in electrical communication with a microprocessor 216. A ROM 222, preferably an EEPROM, stores the fingerprint or other bio-metric data, the encryption keys, and a transaction counter. A battery 214 is connected to provide power to microprocessor 216, preferably within card 210. In the alternative, the energy needed to run microprocessor 216 might be provided through movement of card 210 (as with an automatic watch) or contact of the card or reading apparatus by the user's finger. The finger print scanner 218 is accessibly disposed upon surface 212 of card 210 and connected to microprocessor 216 to provide an input signal triggered by the user placing a thumb or finger upon the surface of scanner 218. For additional information on available technology compatible with the intended use of scanner 218, the reader is referred to U.S. Pat. No. 5,623,552, entitled SELF-AUTHENTICATION IDENTIFICATION CARD WITH FINGERPRINT IDENTIFICATION which is incorporated herein by reference.

A security key display 220 is configured to display dynamic numeric and/or textual data forwarded by microprocessor 216, and intended to accompany the account number for all transactions in the manner outlined below with reference to FIG. 3.

In a manner of use of the bio-metric smart card 210 and the present invention, a user's bio-metric indicator (here, a thumb or finger print) or another user-derived input mechanism triggers in microprocessor 216 the generation of a dynamic security key code displayed in the security key display region 220. The display region 220 preferably comprises an LED array, LCD, or other similar, low-cost display mechanism. The displayed security key is then communicated or transmitted to the credit card authorization service either through a reader, or through a telephone or other remote connection (e.g., entry by the user in a web page interface for an online transaction). The security key display region 220 is configured to display dynamic numeric and/or textual data forwarded by microprocessor 216.

Figure 3:
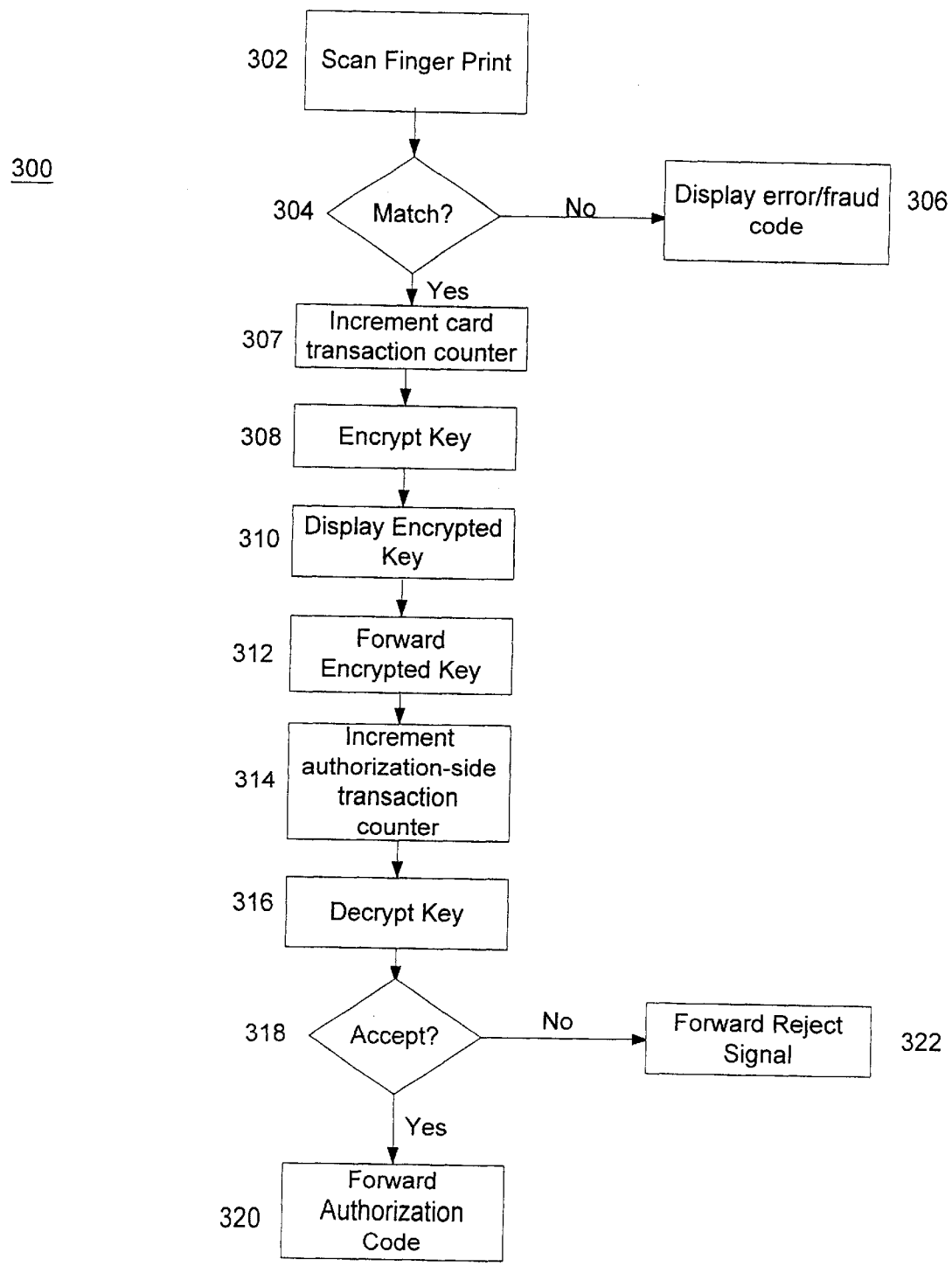
FIG. 3 is a flow-chart illustrating the operation of the present system.

More particularly, referring generally to the flowchart of FIG. 3, at step 302 the user places his or her thumb or finger upon fingerprint scanner 218. In the alternative, step 302 might be replaced with any other form of bio-metric authentication that provides positive identification that an authorized user is, in fact, attempting to use the account number found on the card. The results of scan step 302 are then compared (either by scanner 218 alone or in cooperation with microprocessor 216) at step 304 to a reference file representative of the user's actual print. The reference file might be stored in scanner 218, in microprocessor 216, or in a separate memory unit (ROM 222). If no match is found, an error message or other message indicating an attempted use by other than the authorized user is forwarded at step 306 to display 220. The displayed error code might indicate to the user that an error has been detected with an easily discernable message such as "ERR," or might make such a message recognizable only to the seller, bank or authorization service to better provide an opportunity to recapture a stolen card or detain an unauthorized user.

If a match is found at step 304, the microprocessor 216 increments an activation/transaction counter at step 307 and generates therewith a numeric or alphanumeric security key. The alphanumeric security key is then preferably encrypted at step 308 and forwarded at step 310 to display 220. The operator of a card reader 230, or a remote seller communicating with the user, then inputs or forwards at step 312 the displayed, encrypted security key along with the other information found on surface 212 and any other required information.

Upon receipt of the card information and encrypted key at an authorization service center, an authorization-side activation counter is then incremented at step 314, thereby remaining synchronized to the activation counter of the bio-metric smart card 210. The key is then decrypted at steps 316 in a manner utilizing the incremented activation count to determine at step 318 whether the authorized user initiated the requested purchase authorization. If the activation counter is sufficiently aligned with the counter reading from the card (within an allowed "window" of transaction counter numbers to allow for transactions being processed slightly out of order) and other easily understood criteria are met (i.e., sufficient credit or funds available, no lost or stolen card alert reported), an authorization signal is returned across network 125 at step 320. If any of the new or available criteria are not met, a "transaction rejected" code or signal is returned at step 322.

Figure 4:
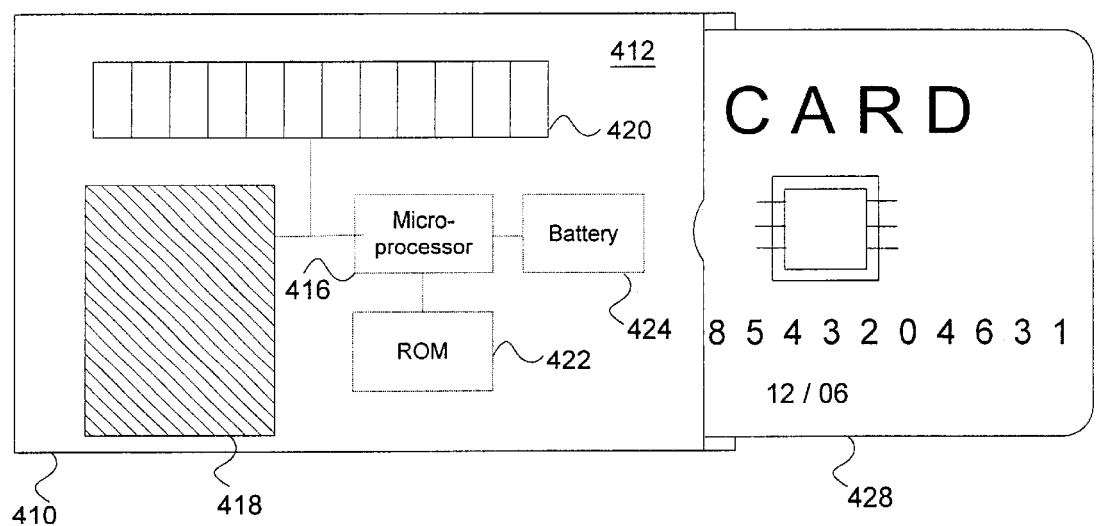
FIG. 4 is a diagram of an alternate embodiment of the present invention.

Referring next to FIG. 4, one embodiment of the inventive card reader 410 is illustrated. The card reader 410 preferably has substantially the same shape and form factor as available plastic credit and debit cards such as card 110 in FIG. 1, although it is generally thicker to accommodate the additional components. The card reader 410 may be formed as a "wallet" such that a smart card can be inserted into the reader as shown in FIG. 4. On the front surface 412, there is preferably provided a bio-metric reading apparatus such as fingerprint scanner 418 in electrical communication with a microprocessor 416. A ROM 422, preferably an EEPROM, stores the fingerprint or other bio-metric data, the encryption keys, and a transaction counter. A battery may also be connected to provide power to microprocessor 416. In the alternative, the energy needed to run microprocessor 416 might be provided through movement of card reader 410 (as with an automatic watch) or contact of the card or by a solar panel. The card reader 410 further includes an alpha-numeric display, such as an LED or LCD display 420.

Finger print scanner 418 is accessibly disposed upon surface 412 of the card reader 410 and is connected to the microprocessor 416 to provide an input signal triggered by the user placing a thumb or finger upon the surface of the scanner 418.

The display 420 is configured to display dynamic numeric and/or textual data forwarded by microprocessor 416, and is intended to accompany the account number for all transactions in the manner outlined above with reference to FIG. 3. The wallet may include an IR or wireless transmitter to automatically transmit the security code to a transaction network. Thus, the present bio-metric reader ("wallet") may be used with existing smart cards, which lack an incorporated microprocessor and/or display.

Figure 5:
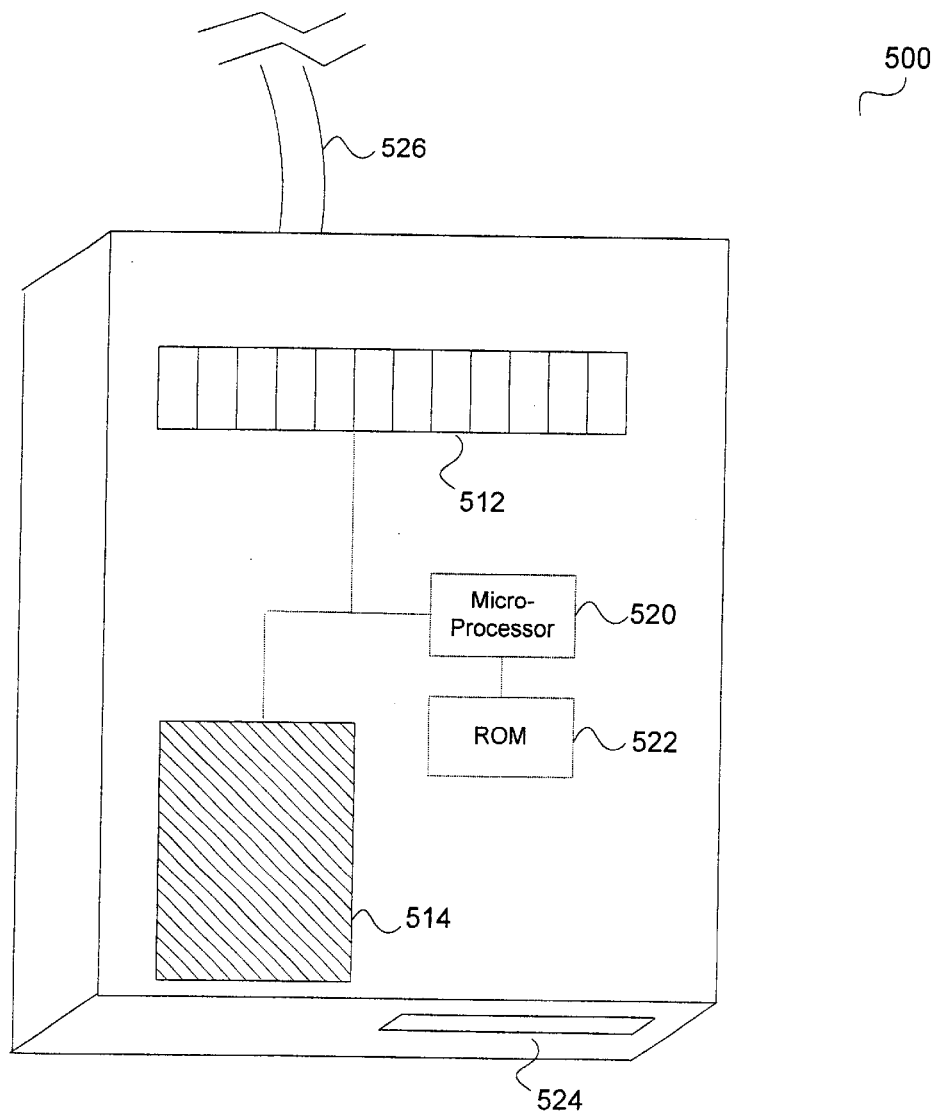
FIG. 5 is a diagram of an alternate embodiment of the present invention.

As shown in FIG. 5, the present invention may be configured in an alternative embodiment as a traditional credit card reader 500 for attachment to a computer or point-of-sale (POS) device, such as an electronic cash register. The card reader includes a microprocessor 510, a display 512, and a bio-metric sensor 514. It also further includes an electrical connection 516 for transferring the security code directly from the reader 500 to the POS device or computer.

Figure 6:
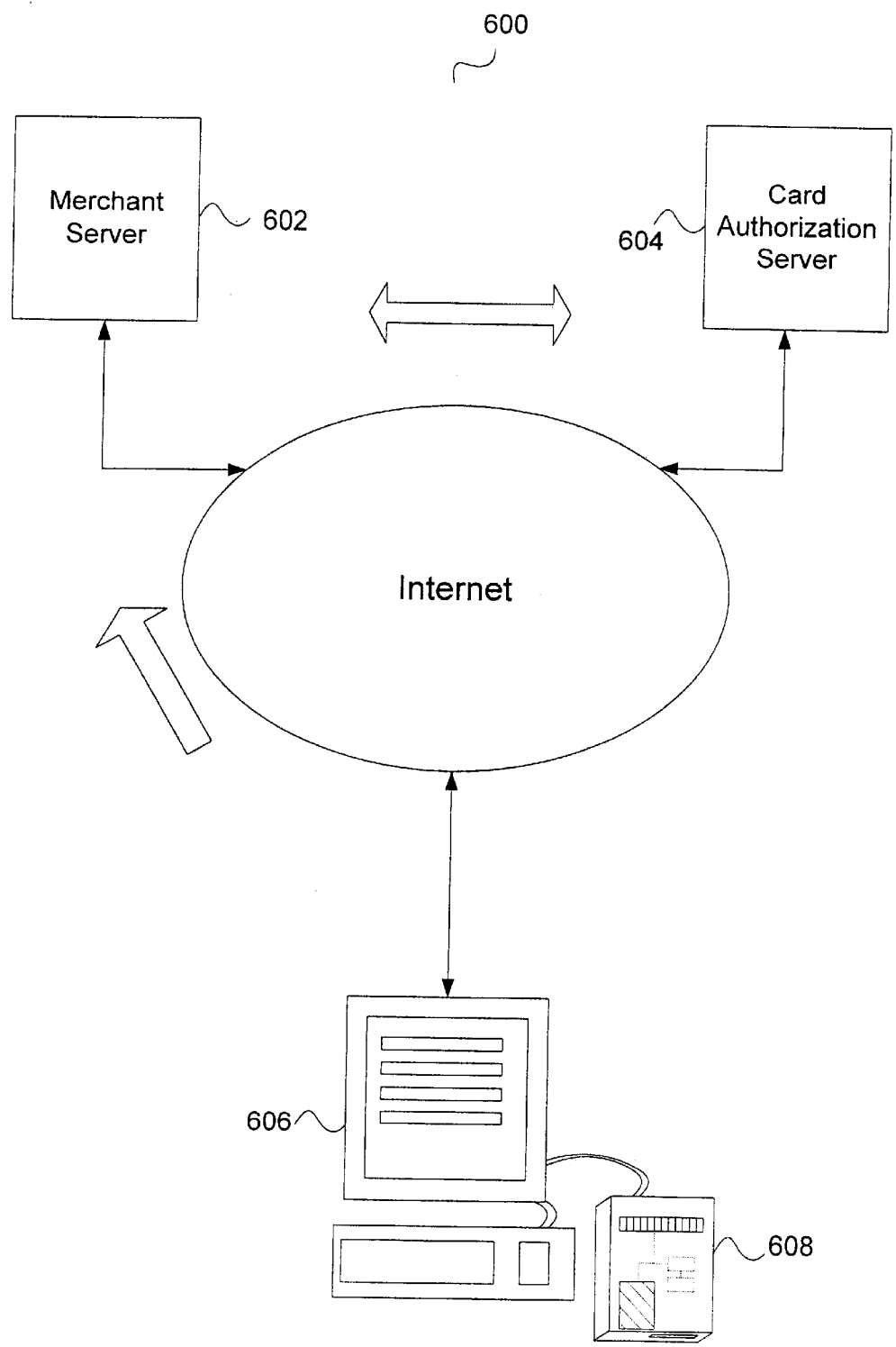
FIG. 6 is diagram illustrating the use of the present invention for purchasing goods over the Internet.

In operation, a user inserts a credit card or smart card into the reader. Once the user places an appropriate finger or thumb on the finger-print sensor 514, the security code is generated by the microprocessor 520 and is displayed on the card reader display 512 or electronically transferred to a network. This security code may then be used to authorize a transaction as described above. FIG. 6 illustrates a system for incorporating the present invention for use in purchasing goods over the Internet. A merchant server 602 forwards the security key transmitted by the reader 608 to an authorization server 604. If the authorization server 604 validates the transaction, the merchant server 602 then processes the purchase request.

As described herein, the present invention provides a greater level of security to credit card transactions, by requiring a bio-metric input, and further by producing a unique security key code for each transaction. The present invention may be incorporated into a new smart card design, including a bio-metric sensor and a display, or may be incorporated as a portable "wallet" that can also be used with standard credit cards.

A preferred method to perform the operation of the encryption and decryption processing will now be discussed in further detail. Other procedures or algorithms may also be used in the present invention, as in well known in the art. First, the following acronyms will be defined:

KCARD Cryptographic key embedded into the bio-metric smart card
KDOMAIN Cryptographic key that resides at the domain company
SHA Secure Hash Algorithm
BSEED Bio-metric encryption seed
MD2 Message Digest Algorithm
DES Data Encryption Standard As described above, the purpose of the bio-metric smart card is to authenticate the subscriber and the transaction for a credit card purchase. In order to perform the authentication, each bio-metric smart card contains a unique cryptographic key, KCARD, which is 80 bits or 10 bytes in length. Each service provider also has a unique key, KDOMAIN, which is 80 bits or 10 bytes.

KCARD is derived cryptographically from KDOMAIN respectively as follows:

KCARD=left-hand 10 bytes of SHA (KDOMAIN∥BSEED)

where as KCARD is equal to the left-hand 80 bits or 10 bytes of the appropriate SHA result. BSEED is a bio-metrically generated value that is 80 bits or 10 bytes in length for each subscriber. In a preferred embodiment, the BSEED value is generated from a user's fingerprint data. The Secure Hash Algorithm, SHA, is defined in the Federal Information Processing Standards publications 180-1, herein incorporated by reference. KDOMAIN is a random value that is set by the service provider.

The authentication message is encrypted data that is communicated from the bio-metric smart card to the service provider for the purpose of authenticating the subscriber and the transaction. The bio-metric smart card communicates this message via the display on the front of the card, or the data is directly sent via IR or other wireless technology, or by a smart card reader that has an electrical connection to the network. The authentication message is comprised of base 10 values so that it will support most current infrastructures (i.e. telephone, Internet, zone machines, etc.). This message is also cryptographically designed so that the number of digits in the message will comply with industries standards (i.e. Visa, MasterCard, Amex, AT&T, MCI, etc.).

As discussed above, the authentication message contains a transaction (serial) number that is incremented for each transaction. This transaction number is incremented for each transaction so that it will only be accepted once. The transaction number is initially set to zero and when it reaches the value of 999999 the card becomes inoperable, or the transaction number is reset.

The bio-metric smart card increments the transaction number stored in the EEPROM of the card for each authentication message. The authentication message is encrypted using the KCARD encryption key and using the MD2 or DES encryption algorithm. This method allows for each authentication message to be unique for each subscriber and for each transaction. For example, performing MD2 (KCARD+transaction number) produces a unique base 10 number. The next transaction increments the transaction number by 1, and thereby produces a different base 10 number, which is not simply the first security code plus one. This provides increased security against fraud, since even if someone has access to one security code, this will not authorize future transactions.

The authentication message is decrypted using the KCARD key and the MD2 or DES algorithm. The decryption key KCARD is generated for each transaction, so that there is no need for transferring this data. The transaction number contained in the authentication message is then referenced to validate the transaction. This is to prevent duplicate transactions. The authentication server may use a transaction number "window" to authorize each transaction in order to accommodate transactions being processed out of order. For example, transactions that are plus five transaction numbers from the current count may be approved.

The smart card or wallet incorporating the present invention must be initialized prior to use in order to store the KDOMAIN value and the user's fingerpint data. This step may be performed at a user's local bank branch, as is currently done to initialize ATM PIN numbers.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for preventing the unauthorized use of at least one non-varying account number, the apparatus comprising:

a user authenticator with bio-metric authentication input providing the apparatus with a user's bio-metric authentication data for proving the user is authorized to use the at least one on-varying account number;

a transaction counter for tracking authorized device access events with contents derived from authorized device access events;

a processor in electrical communication with the user authenticator and counter, the processor being programmed to generate a security key in response to the bio-metric authorization authentication data received via the user authenticator, the security key being derived at least in part from the contents of the counter and at least in part from the user's bio-metric authentication data; and a display unit to display the security key on the apparatus.

2. The apparatus of claim 1, wherein the security key is encrypted before being displayed.

3. The apparatus of claim 1, further comprising a wireless transmitter to transmit the security key to a network device.

4. The apparatus of claim 3, further comprising a smart card reader, wherein the apparatus can be used with existing smart cards to provide a security key for transactions.

5. The apparatus of claim 1, wherein the apparatus is connected to a computer to authorize transactions on a network.

6. The apparatus of claim 1, wherein the user authenticator is a fingerprint scanner.

7. A system or securely processing transactions with an account, the system comprising:

a) a security key device, the device including:
 i) a user authenticator with a bio-metric authentication input providing the device with the user's bio-metric authentication data for proving the user is authorized to use the account;
 ii) a first counter in electrical communication with the user authenticator, the first counter having representative of authorized device access events;
 iii) a key generation processor in electrical communication with the user authenticator and counter, the processor being programmed to generate a security key in response to authentication data received via the user authenticator, the security key being derived at least in part from the contents of the first counter and at least in part from the user's bio-metric authentication data;
 iv) an electronic display in electrical communication with the processor, for displaying the security key on the security key device;

b) a second counter being connected to receive a remote indicator of a successful device access event, the second counter having contents representative of successful device access events; and c) a key confirmation processor programmed to confirm an authenticity of the security key in a manner at least partially dependent upon the contents of the second counter.

8. The system of claim 7, wherein the security key is derived from the contents of the first counter and a user's bio-metric authentication data.

9. The system of claim 7, wherein the user authenticator is a fingerprint scanner.

10. The system of claim 7, wherein the key confirmation processor approves a transaction if the count of successful device access events is within a predefined number of the count of authorized device access events of the first counter.

11. The system of claim 7, wherein the security key is encrypted before being displayed and the key confirmation processor decrypts the key in order to authenticate a transaction.

12. A method of securely authorizing a transaction utilizing an account, the method comprising:

confirming an authorized use of a account card via a bio-metric sensor;

generating user's bio-metric authentication data from a user's input via the bio-metric sensor;

maintaining a first count indicative of a number of instances of such authorized uses;

generating a security key in a manner at least partially dependent upon the count, and at least partially dependent upon the user's bio-metric authentication data;

transmitting the security key to an authorizing authority;

processing the security key at the authorizing authority;

maintaining a second count indicative of a number of transmissions received by the authorizing authority for the account;

confirming that the security key was generated by an authorized user at least in part through use of the user's bio-metric authentication data and in part through the use of the first count and the second count; and authorizing the transaction if the security key was generated by an authorized user.

13. The method of claim 12, wherein the bio-metric sensor is a fingerprint sensor.

14. The method of claim 12, wherein the security key is generated using an encryption algorithm to process a card key and the first count.

15. The method of claim 12, wherein the transaction is authorized if the first count is within a predefined number of the second count.

16. The method of claim 14, wherein the card key is generated from a master key provided by the account provider and from the user's bio-metric authentication data.

* * * * *